United States Patent
Motegi et al.

(10) Patent No.: US 7,110,767 B2
(45) Date of Patent: Sep. 19, 2006

(54) PACKET BASED MOBILE COMMUNICATIONS SYSTEM WITH MULTICAST PAGING OF STANDBY MOBILES

(75) Inventors: Masayuki Motegi, Yokohama (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 481 days.

(21) Appl. No.: 10/259,613

(22) Filed: Sep. 30, 2002

(65) Prior Publication Data

US 2003/0073449 A1    Apr. 17, 2003

(30) Foreign Application Priority Data

Sep. 28, 2001   (JP)   ............................. P2001-303157

(51) Int. Cl.
    *H04Q 7/20*    (2006.01)
(52) U.S. Cl. ...................... 455/445; 455/458; 455/466; 455/434; 370/349; 370/328
(58) Field of Classification Search ................ 455/445, 455/458, 466, 434, 432.1; 370/349, 328
    See application file for complete search history.

(56) References Cited

U.S. PATENT DOCUMENTS

| | | | |
|---|---|---|---|
| 5,548,586 A * | 8/1996 | Kito et al. ................... | 370/349 |
| 5,761,193 A | 6/1998 | Derango et al. | |
| 5,889,770 A * | 3/1999 | Jokiaho et al. ............. | 370/337 |
| 5,901,142 A * | 5/1999 | Averbuch et al. ........... | 370/329 |
| 6,181,933 B1 | 1/2001 | Jeong | |
| 2001/0036834 A1 | 11/2001 | Das et al. | |

FOREIGN PATENT DOCUMENTS

| | | |
|---|---|---|
| WO | WO 98/56206 | 12/1998 |
| WO | WO 01/24557 A1 | 4/2001 |
| WO | WO 01/97549 A1 | 12/2001 |

OTHER PUBLICATIONS

H. Haverinen, et al., "Internet-Draft; Mobile IP Regional Paging", Mobile IP Working Group, XP-002181885, Jun. 2000, pp. 1-15.
Thomas F. La Porta, et al., "Mobile IP and Wide Area Wireless Data", IEEE Wireless Communications and Networking Conference, XP-002145005, Sep. 21, 1999, pp. 1528-1532.

* cited by examiner

*Primary Examiner*—Edan Orgad
(74) *Attorney, Agent, or Firm*—Oblon, Spivak, McClelland, Maier & Neustadt, P.C.

(57) ABSTRACT

For realizing a mobile communication network highly compatible with the Internet and improving channel efficiency and battery conservation in a mobile communication system including a plurality of base stations connected to IP network, a plurality of mobile stations locating in a cell formed by base station, and a server, connected to the IP network, for managing location information of the mobile stations, wherein a set of cells constitutes a paging area, whereas the server manages information of a standby mobile station as location information of mobile stations about paging area in which mobile station locates; the server determines whether a mobile station is in standby state or not when a base station transfers to the server a packet addressed to the mobile station and, if the mobile station is in the standby state, copies the packet by the number of the base stations corresponding to the paging area related to the mobile station and multicasts thus copied packets.

17 Claims, 12 Drawing Sheets

| IP ADDRESS OF MH | IP ADDRESS OF BASE STATION | STATE OF MH |
|---|---|---|
| *.*.***.1 | 100.100.100.1 | COMMUNICATING |
| *.*.***.2 | 100.100.100.11~ 100.100.100.20 | STANDBY |
| *.*.***.3 | 100.100.100.21 | COMMUNICATING |
| *.*.***.4 | 100.100.100.101 | COMMUNICATING |
| *.*.***.5 | 100.100.100.111~ 100.100.100.120 | STANDBY |
| ⋮ | ⋮ | ⋮ |

PACKET BASED MOBILE COMMUNICATIONS SYSTEM WITH MULTICAST PAGING OF STANDBY MOBILES

BACKGROUND OF THE INVENTION

1. Field of the Invention

The present invention relates to a paging method in a mobile communication system based on Internet Protocol (hereinafter referred to as IP); the mobile communication system; a server, a base station, and a mobile station constituting this system; and a paging program executed in the server.

2. Related Background Art

A second generation cordless telephone system referred to as PHS (Personal Handyphone System) has been known (ARIB RCRSTD-28 Version 3.2: Second Generation Cordless Telephone System Standard). An incoming packet addressed to the mobile station in this system is received, a server refers to the location information of the destination mobile station in a PHS service control station, and a paging control packet is broadcasted in a paging area including a cell where the mobile station locates in. Also, using PCH (paging channel), paging control packet is broadcasted from the base station to the mobile station.

On the other hand, a digital car phone system referred to as PDC (Personal Digital Cellular) has been known (ARIB RCR STD-27H: Digital Car Phone System Standard). An incoming packet addressed to the mobile station in this system is received, a server refers to the location information of the mobile station in HLR (home location register) in the case of users within a home network or in GLR (gateway location register) in the case of roaming users, and a paging control packet is broadcasted for a plurality of base stations within a paging area in which the mobile station has registered its location information, using PCH (paging channel), paging control packet is broadcasted from the base station to the mobile station.

Meanwhile, a mobile IP technique has been known. The outline of mobile IP will now be explained with reference to FIG. 9. It is assumed that a terminal 91 is about to communicate with a portable terminal (mobile host, hereinafter referred to as MH) 98 such as cellular phone or mobile terminal. Suppose that the MH 98 is in the cell of a foreign agent (hereinafter referred to as FA) 95. The terminal 91 transmits a packet 92 addressed to the MH 98.

Thus transmitted packet 92 is transferred to a home agent (hereinafter referred to as HA) 93, where an address X corresponding to the FA 95 whose cell the MH 98 located in is added to the transferred packet, to generate a packet 94. Thereafter, the packet 94 is transferred to the FA 95. The FA 95 eliminates the added IP address X, and transfers the resulting packet 97 to the MH 98. As a consequence, the terminal 91 and the MH 98 communicate with each other.

Suppose that the MH 98 moves from the cell of the FA 95 to the cell of another FA 96. Thus moved MH 98 reports its own IP address and the IP address Y of FA 96 to the HA 93 and, at the same time, its own IP address to the FA 96. In the subsequent communication addressed to the MH 98, the HA 93 adds the IP address Y of the FA 96 to the packet, thus generating a packet 99. As a consequence, MH 98 can continue communicating even after the MH 98 moves from the cell of the FA 95 to the cell of the FA 96.

However, the above-mentioned techniques about PHS and PDC have not been concerned with the implementation of IP, and may not achieve high compatibility with the Internet, thus failing to consider their application to future mobile communication systems using IP networks.

Also, in mobile IP since there is only one FA whose cell an MH located in, hand-over is executed every time the MH moves between cells. Namely, even if the MH is in the idle state, it must register its location information to the HA and the FA whose cell the MH moved into when transiting between cells. This increases the control traffic at the time of registering the location information, and the increase may worsen channel efficiency and enlarge battery consumption, thus being unsuitable for high-speed, large-capacity multimedia mobile communication systems using IP networks for covering a large area.

SUMMARY OF THE INVENTION

In order to overcome the problems mentioned above, it is an object of the present invention to provide a paging method, a mobile communication system, a server, a base station, a mobile station, and a paging program which can realize a mobile communication network highly compatible with the Internet and improve the channel efficiency and battery conservation.

For achieving the above-mentioned object, the present invention provides a paging method in a mobile communication system including a plurality of base stations connected to IP network, a plurality of mobile stations locating in a cell formed by base station, and a server, connected to the IP network, comprising a location information management table storing location information of the mobile stations including a connection state, wherein a set of cells formed by the base stations constitutes a paging area, and wherein the server manages information of a standby mobile station as location information of mobile stations about paging area in which mobile station locates; the method comprising a transfer step in which a packet transmitted from a base station to mobile station is transferred to the server; a determination step in which the server receiving the packet determines, according to the location information management table, whether the mobile station is in standby state or not; a copy step in which, if the mobile station is in the standby state, the server copies the packet by the number of base stations corresponding to the paging area related to the mobile station; and a multicast step in which the server multicasts the packets obtained by copying to the base stations corresponding to the paging area.

According to this aspect of the present invention, a plurality of packets obtained by copying are multicasted to base stations corresponding to the paging area, whereby it is not necessary for a mobile station to register its location information every time it moves between cells as conventionally required. This can prevent control traffic from increasing due to location registration, thus making it possible to keep the channel efficiency from decreasing, and the battery consumption at the time of transmitting and receiving control packets from increasing. Namely, it is suitable for high-speed, large-capacity multimedia mobile communication systems using IP networks for covering a large area, thus being able to realize a mobile communication network highly compatible with the Internet and improve the channel efficiency and battery conservation.

Preferably, in the paging method in accordance with present invention, the server manages location information about IP address of base station whose cell a communicating mobile station locates in, whereas the base station has a mobile station management table registering IP addresses of communicating mobile stations; the method further comprising a registration determining step in which a base station having received a packet or a paging control packet by the multicasting determines whether the mobile station is registered in the mobile station management table or not; a paging step in which, if the mobile station is not registered in the mobile station management table, the base station broadcasts a destination address of the packet via a broadcasting control channel to standby mobile stations; and a response time processing step in which, if the mobile station responds to the paging, the base station adds IP address of the mobile station to the mobile station management table and transmits to the server a control signal indicating that the mobile station locates in a cell of the base station.

According to this aspect of the present invention, the paging area can be defined in IP network as well, whereby paging can be executed to a paging area constituted by a plurality of base stations, which is effective in that unnecessary control signal traffic at the time of location registration can be cut down, and that the channel efficiency and battery conservation can be improved.

Also, since the IP network is taken into consideration, it is more effective than the conventional techniques in that IP can be implemented, whereby a mobile communication network highly compatible with the Internet can be realized.

The paging method in accordance with the present invention may also be configured as follows: Namely, the present invention provides a paging method in a mobile communication system including a plurality of base stations connected to IP network, a plurality of mobile stations locating in a cell formed by base station, and a server, connected to the IP network, comprising a location information management table storing location information of the mobile stations including a connection state, wherein a set of cells formed by the base stations constitutes a paging area, and wherein the server manages information of a standby mobile station as location information of mobile stations about paging area in which mobile station locates; the method comprising a transfer step in which a packet transmitted from a base station to mobile station is transferred to the server; a determination step in which the server receiving the packet determines, according to the location information management table, whether the mobile station is in standby state or not; a generation step in which, if the mobile station is in the standby state, the server buffers the packet and generates paging control packets by the number of base stations corresponding to the paging area related to the mobile station; and a multicast step in which the server multicasts a plurality of generated paging control packets to the base stations corresponding to the paging area.

This paging method is effective not only in the two points mentioned above but also in that, since a paging control packet having a short packet length is used for a paging, the control signal traffic at the time of paging can be kept lower, whereby the network load can be cut down.

The present invention can be described not only as the paging method as mentioned above, but also as a mobile communication system, a server, a base station, and a mobile station constituting the same, and a paging program executed by the server as follows:

Namely, the present invention provides a mobile communication system including a plurality of base stations connected to IP network, a plurality of mobile stations locating in a cell formed by base station, and a server, connected to the IP network, for managing location information of the mobile stations including a connection state, wherein a set of cells formed by the base stations constitutes a paging area; the base station comprising transfer means for transferring to the server a packet transmitted to mobile station when the base station becomes a sender; the server comprising a location information management table storing information of a standby mobile station as location information of the mobile stations about the paging area in which the mobile station locates; determination means for determining whether the mobile station is in standby state or not according to the location information management table when the packet is received; copy means for copying the packet by the number of base stations corresponding to the paging area related to the mobile station if the mobile station is in the standby state; and multicast means for multicasting the packets obtained by copying to the base stations corresponding to the paging area.

Also, the present invention provides a mobile communication system including a plurality of base stations connected to IP network, a plurality of mobile stations locating in a cell formed by base station, and a server, connected to the IP network, for managing location information of the mobile stations including a connection state, wherein a set of cells formed by the base stations constitutes a paging area; the base station comprising transfer means for transferring to the server a packet transmitted to mobile station when the base station becomes a sender; the server comprising a location information management table storing information of a standby mobile station as location information of the mobile stations about the paging area in which the mobile station locates; determination means for determining whether the mobile station is in standby state or not according to the location information management table when the packet is received; generation means for buffering the packet and generating paging control packets by the number of base stations corresponding to the paging area related to the mobile station if the mobile station is in the standby state; and multicast means for multicasting a plurality of generated paging control packets to the base stations corresponding to the paging area.

Preferably, in each of the mobile communication systems, the location information management table further stores information of a communicating mobile station as location information of the mobile stations about IP address of a base station whose cell the mobile station locates in, the base station further comprising a mobile station management table registering IP addresses of communicating mobile stations; registration determining means for determining whether the mobile station is registered in the mobile station management table or not if a packet or a paging control packet is received; paging means for paging standby mobile stations via a broadcasting control channel if the mobile station is not registered in the mobile station management table; and response time processing means for adding IP address of the mobile station to the mobile station management table and transmitting to the server a control signal indicating that the mobile station locates in a cell of the base station if the mobile station responds to the paging.

The present invention provides a server constituting a mobile communication system together with a plurality of base stations connected to IP network, and a plurality of mobile stations locating in a cell formed by base station; wherein, in the mobile communication system, a set of cells formed by the base stations constitutes a paging area; the server being connected to the IP network and managing location information of the mobile stations including a connection state; the server comprising a location information management table storing information of a standby mobile station as location information of the mobile stations about the paging area in which the mobile station locates;

determination means for determining whether mobile station is in standby state or not according to the location information management table when a packet transmitted to the mobile station is received; copy means for copying the packet by the number of base stations corresponding to the paging are a related to the mobile station if the mobile station is in the standby state; and multicast means for multicasting the packets obtained by copying to the base stations corresponding to the paging area.

Also, the present invention provides a server constituting a mobile communication system together with a plurality of base stations connected to IP network, and a plurality of mobile stations locating in a cell formed by base station; wherein, in the mobile communication system, a set of cells formed by the base stations constitutes a paging area; the server being connected to the IP network and managing location information of the mobile stations including a connection state; the server comprising a location information management table storing information of a standby mobile station as location information of the mobile stations about the paging area in which the mobile station locates; determination means for determining whether mobile station is in standby state or not according to the location information management table when a packet transmitted to the mobile station is received; generation means for buffering the packet and generating paging control packets by the number of base stations corresponding to the paging are a related to the mobile station if the mobile station is in the standby state; and multicast means for multicasting a plurality of generated paging control packets to the base stations corresponding to the paging area.

Preferably, in each of the servers, the location information management table is configured to store location information of the mobile stations while using IP addresses of the mobile stations as a key.

Preferably, each paging area is provided with a unique paging area identifier, whereas the server manages the paging area according to the paging area identifier.

The present invention provides a base station constituting a mobile communication system together with a plurality of mobile stations locating in a cell formed by the base station, and a server, connected to IP network, for managing location information of the mobile stations including a connection state; the base station being connected to the IP network; a set of a cell formed by the base station and cells formed by other base stations adjacent thereto constituting a paging area; the base station comprising transfer means for transferring to the server a packet transmitted to mobile station when the base station becomes a sender; a mobile station management table registering IP addresses of communicating mobile stations; registration determining means for determining whether the mobile station is registered in the mobile station management table or not if a packet or a paging control packet is received from the server; transmission means for transmitting a packet to the mobile station by using a communication channel if the mobile station is registered in the mobile station management table; paging means for paging standby mobile stations via a broadcasting control channel if the mobile station is not registered in the mobile station management table; and response time processing means for adding IP address of the mobile station to the mobile station management table and transmitting to the server a control signal indicating that the mobile station locates in a cell of the base station if the mobile station responds to the paging.

The present invention provides a mobile station constituting a mobile communication system together with a plurality of base stations connected to IP network, and a server, connected to the IP network, for managing location information of the mobile station including a connection state; wherein, in the mobile communication system, a set of cells formed by the base stations constitutes a paging area; the mobile station locating in the cell formed by base station; the mobile station transiting between at least two states including a standby state for periodically receiving a packet transmitted from a base station; the mobile station comprising transit control means for controlling the mobile station such that the mobile station transits to the standby state when requested by a user or when no packet is transmitted and received for a predetermined period and that the mobile station transits to the communicating state when mobile station is paged by network or when mobile station transmits origination packet.

Preferably, in the mobile station, the transit control means reports the state of own station to the server when transiting to the standby state and when transiting to the communicating state, and immediately transits to the communicating state when received a packet while in the standby state.

The present invention provides a paging program executed by a computer provided with a server constituting a mobile communication system together with a plurality of base stations connected to IP network, and a plurality of mobile stations locating in a cell formed by base station; wherein, in the mobile communication system, a set of cells formed by the base stations constitutes a paging area; the server being connected to the IP network and comprising a location information management table storing information of a standby mobile station as location information of the mobile stations about the paging area in which the mobile station locates; the program causing the computer to execute, as shown in FIG. 12, a determination step S01 of determining whether mobile station is in standby state or not according to the location information management table when a packet transmitted to the mobile station is received; a copy step S02 of copying the packet by the number of base stations corresponding to the paging area related to the mobile station if the mobile station is in the standby state; and a multicast step S03 of multicasting the packets obtained by copying to the base stations corresponding to the paging area.

The present invention provides a paging program executed by a computer provided with a server constituting a mobile communication system together with a plurality of base stations connected to IP network, and a plurality of mobile stations locating in a cell formed by base station; wherein, in the mobile communication system, a set of cells formed by the base stations constitutes a paging area; the server being connected to the IP network and comprising a location information management table storing information of a standby mobile station as location information of the mobile stations about the paging area in which the mobile station locates; the program causing the computer to execute, as shown in FIG. 13, a determination step S11 of determining whether mobile station is in standby state or not according to the location information management table when a packet transmitted to the mobile station is received; a generation step S12 of buffering the packet and generating paging control packets by the number of base stations corresponding to the paging area related to the mobile station; and a multicast step S13 of multicasting a plurality of generated paging control packets to the base stations corresponding to the paging area.

BRIEF DESCRIPTION OF THE DRAWINGS

FIG. 10 is a chart showing an example of location information management table;

DESCRIPTION OF THE PREFERRED EMBODIMENTS

In the following, an embodiment of the paging method in the IP-based mobile communication system in accordance with the present invention will be explained.

Figure 1:
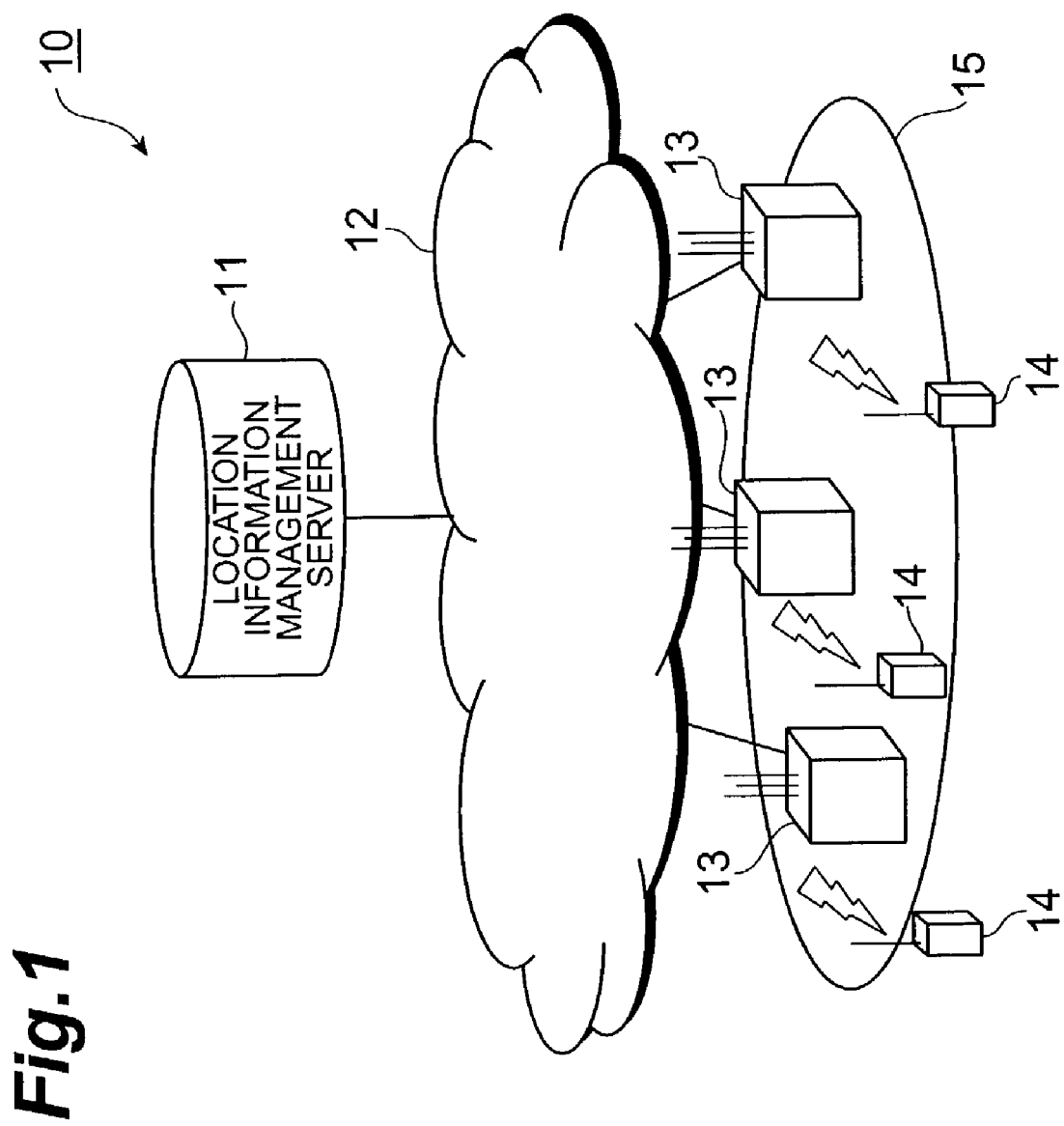
FIG. 1 is an overall view of the mobile communication system in accordance with an embodiment.

FIG. 1 shows an IP-based mobile communication system 10 assumed by this embodiment. As shown in FIG. 1, the mobile communication system 10 includes a plurality of base stations 13 connected to IP network 12; a plurality of mobile stations 14 locating in a cell formed by base station 13; and a location information management server 11, connected to the IP network 12, acting as a server for managing location information of the mobile stations 14 including the connection states of the mobile stations 14, whereas a set of the cells formed by a plurality of base stations 13 constitutes a paging area 15.

Each mobile station 14 corresponds to a portable terminal (so-called mobile host (hereinafter referred to as MH)) such as cellular phone or mobile terminal. The MHs 14 locate in the cells formed by the base stations 13 connected to the IP network 12, and register their locations in the paging area 15 formed by a set of the cells.

Figure 11:
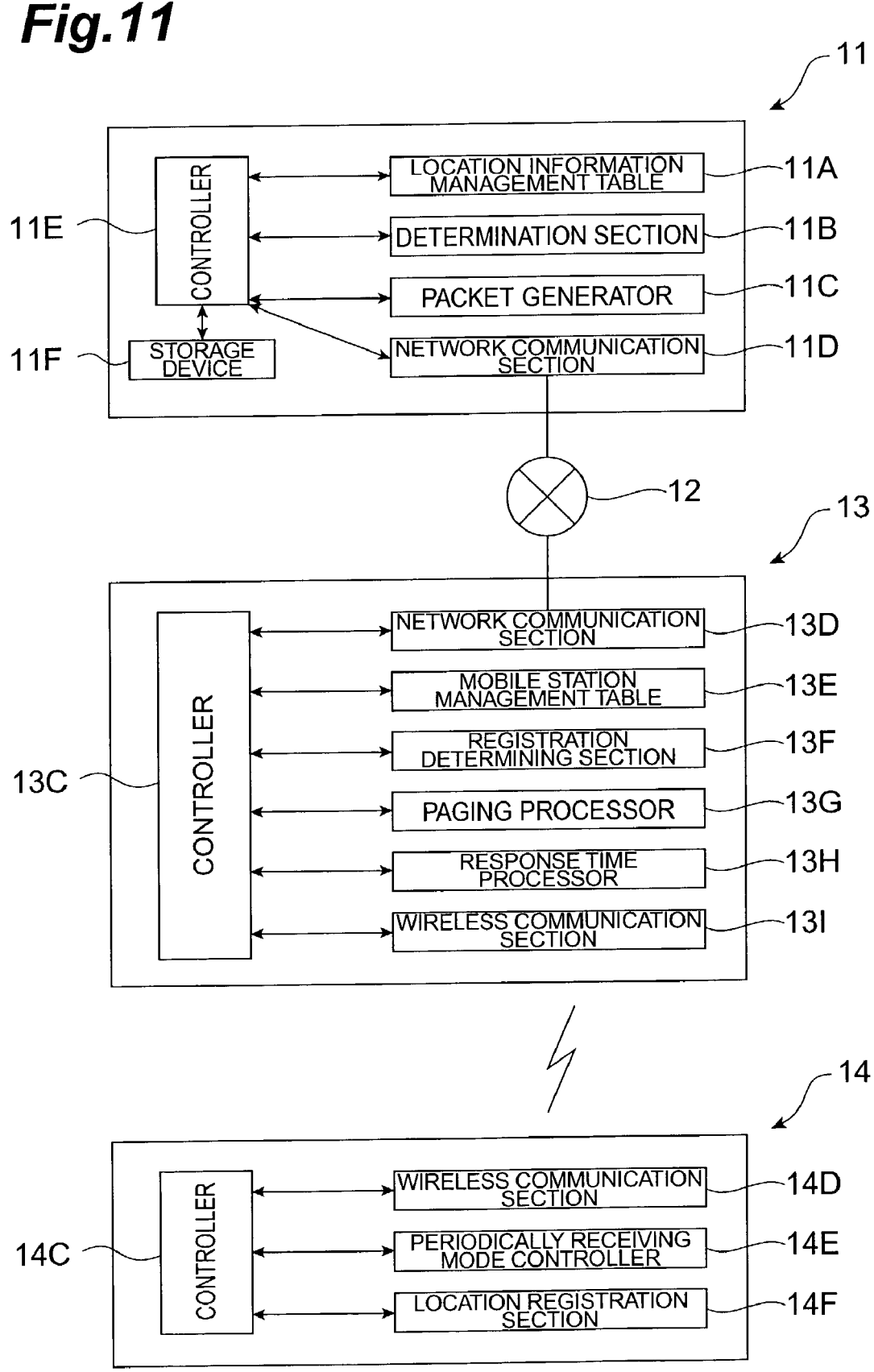
FIG. 11 is a functional block diagram showing the configuration of each constituent of a mobile communication system.
Figure 12:
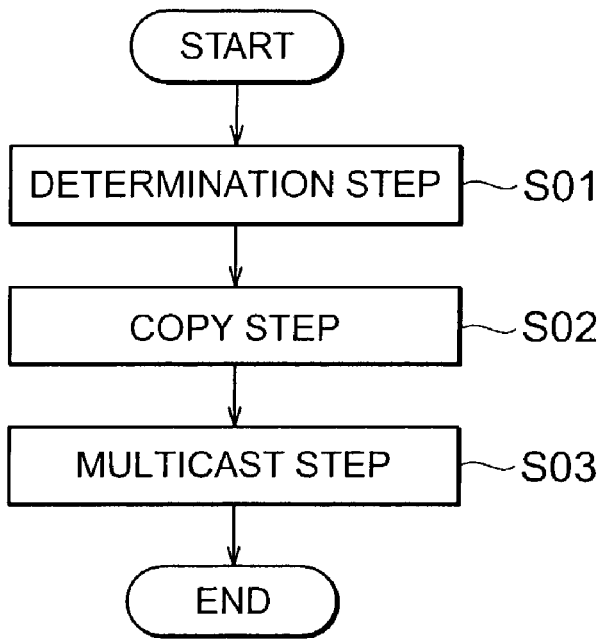
FIG. 12 is a flowchart showing a first mode of the paging program in accordance with the present invention.
Figure 13:
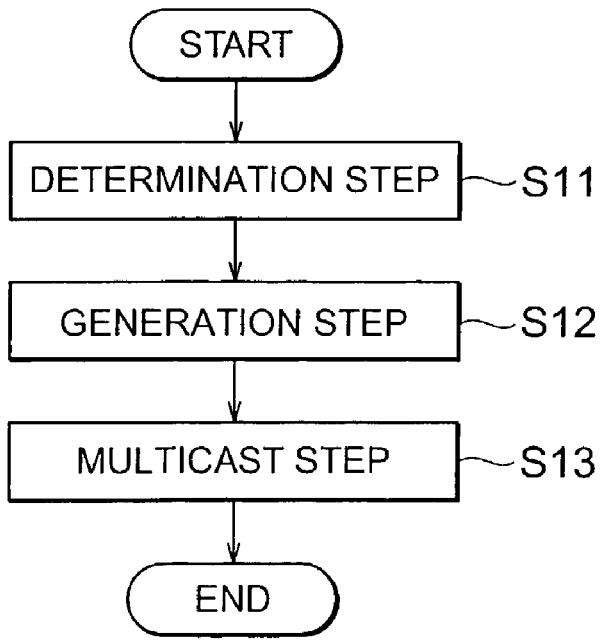
FIG. 13 is a flowchart showing a second mode of the paging program in accordance with the present invention.

With reference to FIG. 11, the respective configurations of the location information management server 11, base station 13, and MH 14 will now be explained in brief.

As shown in FIG. 11, the location information management server 11 includes a storage device 11F for temporarily storing packet data and the like; a network communication section 11D, including a function of multicasting to a plurality of base stations 13 corresponding to the paging area 15 (FIG. 1), for transmitting and receiving packets; a location information management table 1A storing location information of the MHs 14 including the connection states of the MHs 14; a determination section 11B for determining whether one MH 14 is in standby state or not according to the location information management table 11A when a packet transmitted to the one MH 14 is received by the network communication section 11D; a packet generator 11C for copying and generating packets or paging control packets by the number of base stations corresponding to the paging area 15 (FIG. 1) related to the one MH 14 if the one MH 14 is in the standby state; and a controller 11E for monitoring/controlling the respective operations of the foregoing sections.

The location information management table, determination means, copy means and generation means, and multicast means provided with the server in accordance with the present invention correspond to the location information management table 11A, determination section 11B, packet generator 11C, and network communication section 11D, respectively.

As shown in FIG. 10, the location information management table 11A stores information of the IP addresses of MHs 14, the IP addresses of the base stations 13 constituting the paging areas 15 in which the MHs 14 register their locations, and the state (standby state or communicating state) of each MH 14. Here, as the location information of MHs 14, information of standby MHs 14 is stored about the paging areas 15 in which these MHs 14 locate, whereas information of communicating MHs 14 is stored about the IP addresses of the base stations whose cells these MHs 14 locate in.

As shown in FIG. 11, each base station 13 includes a network communication section 13D for communicating with the location information management server 11 via the network 12; a mobile station management table 13E registering the IP addresses of MHs 13 located in the cell of own station; a registration determining section 13F for determining, when a packet or a paging control packet is received from the location information management server 11, whether its destination MH 14 is registered in the mobile station management table 13E or not; a paging processor 13G for paging the standby MHs 14 under control via a broadcasting control channel if the destination MH 14 is not registered in the mobile station management table 13E; a response time processor 13H for adding the IP address of the destination MH 14 to the mobile station management table 13E and transmitting to the location information management server 11 a control signal indicating that this MH 14 locates in the cell of own station if the destination MH 14 responds to the paging; a wireless communication section 13I for communicating by packet with MHs 14 and other base stations 13; and a controller 13C for monitoring/controlling the respective operations of the foregoing sections.

The transfer means, mobile station management table, registration determining means, paging means, and response time processing means provided with the base station in accordance with the present invention correspond to the network communication section 13D, mobile station management table 13E, registration determining section 13F, paging processor 13G, and response time processor 13H, respectively.

Each MH 14 includes a wireless communication section 14D for communicating by packet with base stations 13 and other MHs 14; an periodically receiving mode controller 14E for transiting to a mode for periodically receiving packets transmitted from the base stations 13, changing this period, and so forth if no packets are transmitted and received for a predetermined period in the communicating state; a location registration section 14F for registering location information to the location information management server 11; and a controller 14C for monitoring/controlling the respective operations of the foregoing sections.

Paging methods by the location information management server 11 in this embodiment will now be explained. In the following, as the paging methods in this embodiment, a first paging method of paging by copying a packet and multicasting thus copied packets, and a second paging method of paging by copying a paging control packet instead of the packet and multicasting thus copied packets will be explained successively.

Figure 2:
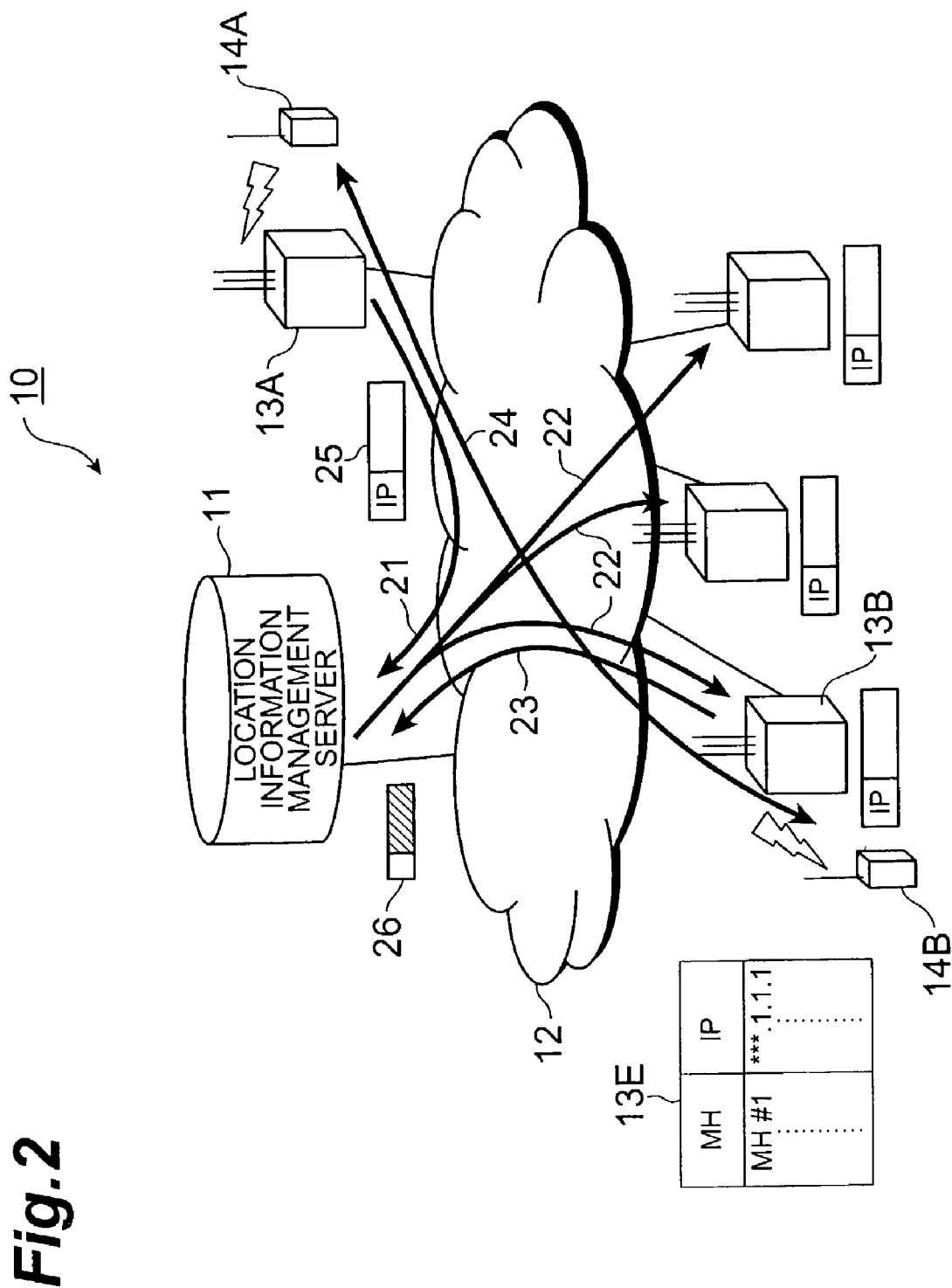
FIG. 2 is a view showing an outline of a first paging method.

To begin with, the outline of the first paging method will be explained with reference to FIG. 2. It is assumed that mobile host 14A (hereinafter referred to as MH 14A) is about to transmit a packet addressed to mobile host 14B (hereinafter referred to as MH 14B). The packet 25 transmitted by the MH 14A is once transferred to the location information management server 11 (arrow 21) via base station 13A, whereas the location information management server 11 verifies the state (communicating state or standby state) of MH 14B according to the location information management table 11A. Here, the packet 25 once transferred to the location information management server 11 is referred to as packet 25.

If the MH 14B is in the communicating state, the location information management server 11 routes the packet 25 to the base station 13B whose cell the MH 14B locates in. If the MH 14B is in the standby state, on the other hand, then the location information management server 11 refers to the paging area in which the MH 14B has registered its location, copies the packet by the number of base stations 13 constituting this paging area, and multicasts thus copied packets 15 to a plurality of base stations 13, thereby paging to the base stations (arrow 22).

The base station (base station 13B here, by way of example) having received the packet 25 refers to the mobile station management table 13E of own station and, if the IP address of the MH 14B contained in the packet 25 is not registered in the mobile station management table 13E, broadcasts the destination address via a broadcasting control channel. If it is found as a result of paging that the MH 14B not registered in the mobile station management table 13E locates in the cell of the base station 13B, the base station 13B adds the IP address of MH 14B to the mobile station management table 13E of own station and, at the same time, transfers to the location information management server 11 a response packet 26 from the destination MH 14B locating in the cell of the base station 13B (arrow 23). In the subsequent communications, the packet 25 is routed to the destination MH 14B, to allow communications (arrow 24).

Figure 4:
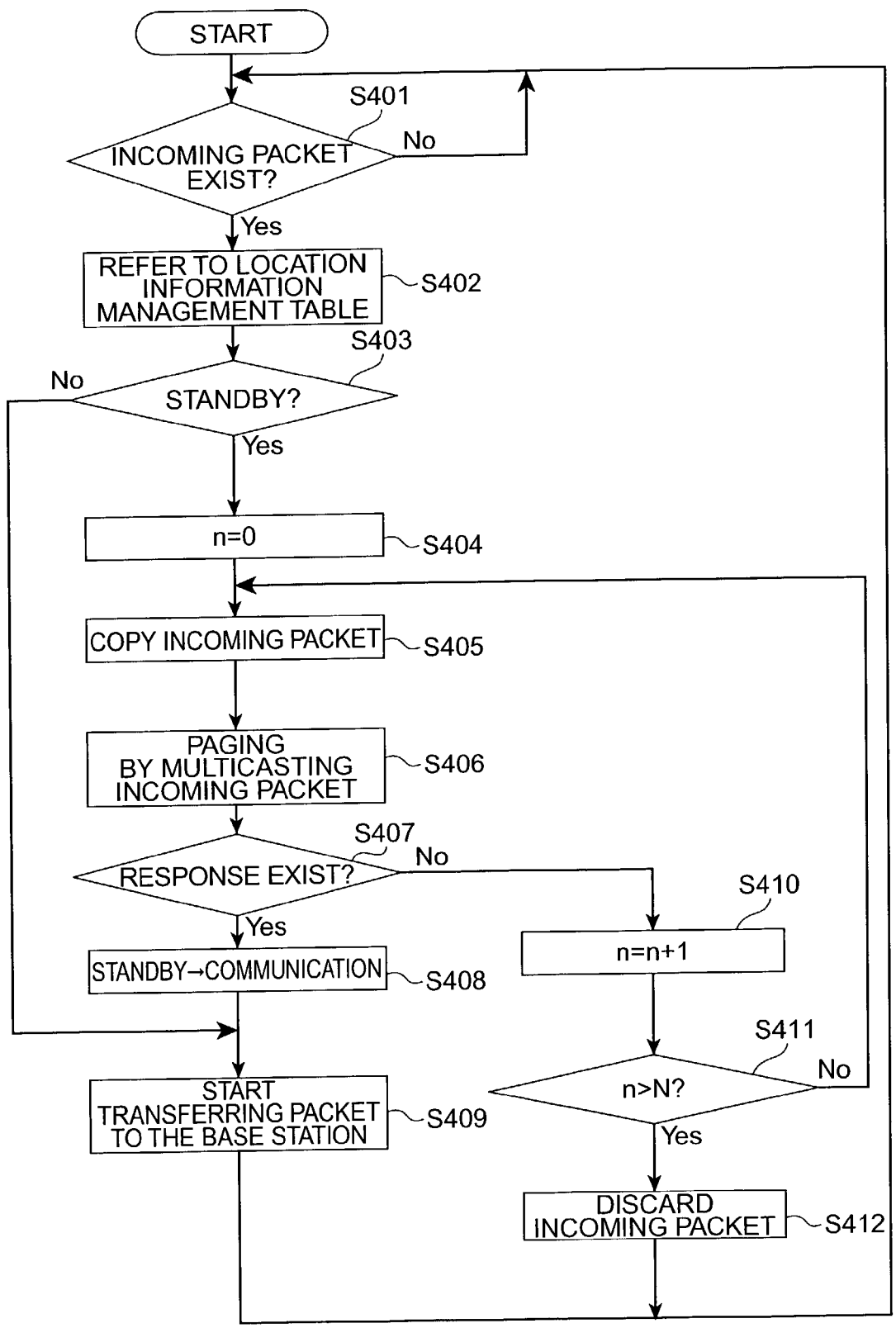
FIG. 4 is a flowchart showing the processing of a location information management server in accordance with the first paging method.

The processing concerning the first paging method executed by the location information management server 11 will now be explained with reference to FIG. 4. First, it is verified whether the packet 25 is transferred to the location information management server 11 or not (S401). If the packet is transferred, the location information management table 11A in the location information management server 11 is referred to (S402). Then, it is determined as a result of the reference whether the MH 14 is in the standby state or not (S403).

If the MH 14 is communicating, the packet 25 is routed to its in-zone base station 13, to start communications (S409) Thereafter, the flow returns to S401.

If the MH 14 is in the standby state, the value of counter n for counting the number of paging operations is reset to 0 (S404), and the packet 25 is copied by the number of base stations 13 constituting the paging area 15 in which the MH 14 has registered its location (S405). Then, the packet 25 is multicasted for paging to the plurality of base stations 13 (S406). Thereafter, a response is waited for a predetermined period (S407). If there is no response from the destination MH 14 in the predetermined period, the value of counter n is incremented by 1 (S410), and a paging control packet is broadcasted again (S405, S406). This operation is repeated by N times at the maximum (S405 to S411). If there is no response even after the n-th paging operation, then the packet is discarded (S412).

If there is a response from the destination MH 14 (S407) by contrast, then the state of MH 14 registered in the location information management table 11A is changed from the standby state to the communicating state (S408), and the packet 25 is routed to the responded base station 13, to start communications (S409). Thereafter, the flow returns to S401.

The second paging method will now be explained. In the location information management server 11 executing the second paging method, the packet generator 11C is configured such that, if the destination MH 14 is in the standby state, the packet is temporarily buffered into the storage device 11F and, at the same time, paging control packets are generated by the number of base stations 13 corresponding to the paging area 15 (FIG. 1) related to the MH 14.

Figure 3:
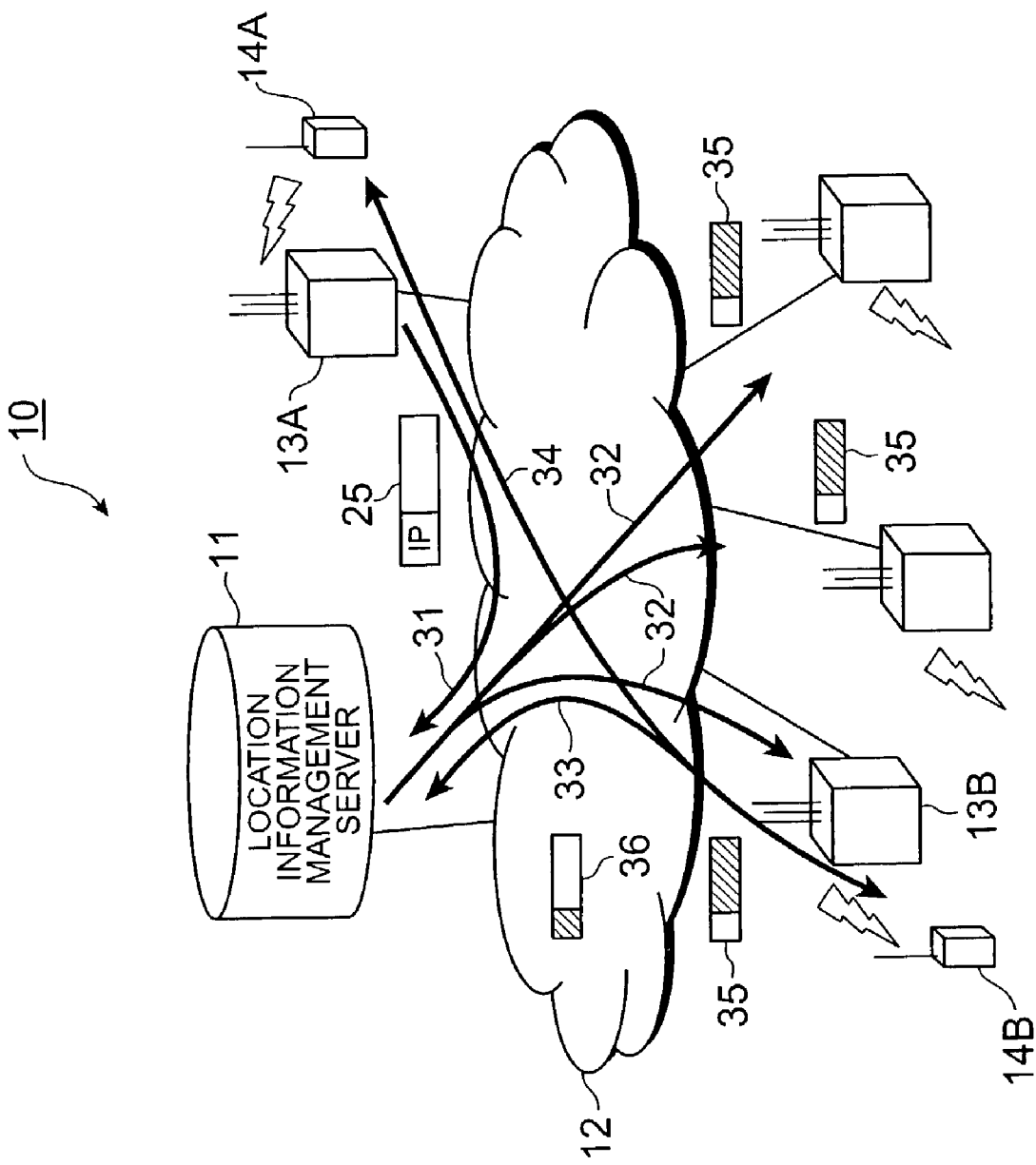
FIG. 3 is a view showing an outline of a second paging method.

To begin with, the outline of the second paging method will be explained with reference to FIG. 3. Here, it is assumed that mobile host 14A (MH 14A) shown in FIG. 3 is about to transmit a packet addressed to mobile host 14B (MH 14B). The packet 25 addressed to the MH 14B is once transferred to the location information management server 11 (arrow 31), whereas the location information management server 11 verifies the state (communicating state or standby state) of MH 14B.

If the MH 14B is in the communicating state, the location information management server 11 routes the packet 25 to the base station 13B whose cell the MH 14B locates in as in known mobile IP techniques. If the MH 14B is in the standby state, by contrast, the location information management server 11 temporarily buffers the packet 25. Then, the paging area including the base station 13B whose cell the base station 13B locates in is referred to, paging control packets 35 are prepared by the number of base stations 13 constituting the paging area, and these paging control packets 35 are multicasted to a plurality of base stations 13 (arrow 32). Each base station 13 having received the paging control packet 35 broadcasts the destination address contained in the paging control packet 35 by using a paging channel, thereby paging the MH 14B having this destination address.

If the MH 14B receives its own IP address being broadcasted through the paging channel, it returns a response packet 36 to the location information management server 11 by way of the base station 13B (arrow 33). The location information management server 11 routes the temporarily buffered packet 25 to the base station 13B and, if the packet 25 arrives thereafter, starts transferring the packet to the base station 13B (arrow 34).

Figure 5:
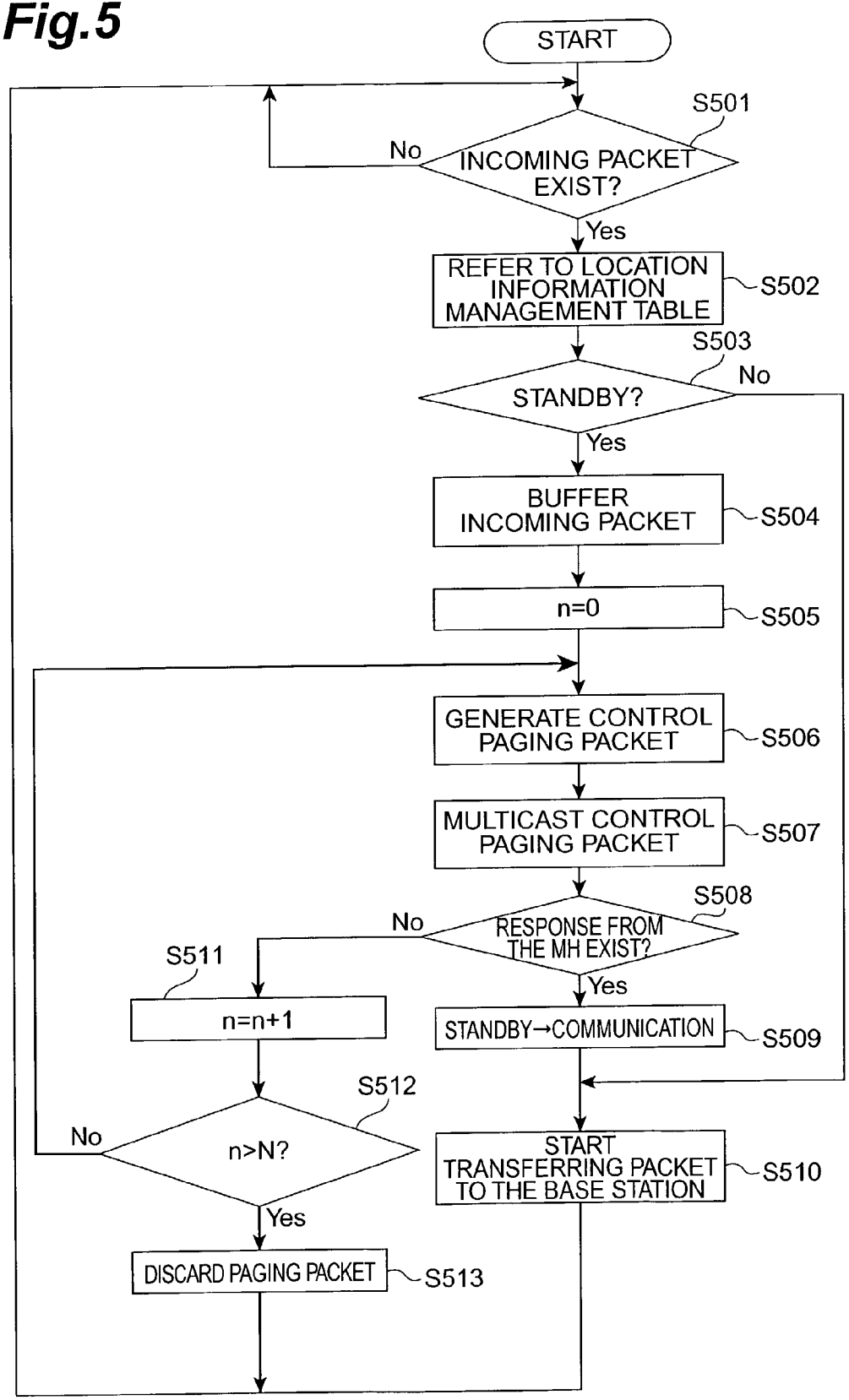
FIG. 5 is a flowchart showing the processing of a location information management server in accordance with the second paging method.

With reference to FIG. 5, the operation flow of the location information management server 11 in accordance with the second paging method will now be explained. Initially, it is determined whether the packet 25 is transferred to the location information management server 11 or not (S501) If the packet 25 is transferred, the location information management table 11A in the location information management server 11 is referred to (S502). Then, it is determined as a result of the reference whether the MH 14 is in the standby state or not (S503).

If the MH 14 is in the communicating state, the packet 25 is routed to the in-zone base station 13, to start communications (S510). Then, the flow returns to S501.

If the MH 14 is in the standby state, the location information management server 11 once buffers the packet 25 (S504). Then, the value of counter n counting the number of paging operations is reset to 0 (S505), and paging control packets 35 are prepared by the number of base stations 13 constituting the paging area 15 in which the MH 14 has registered its location (S506). Then, the paging control packets 35 are multicasted to the plurality of base stations 13, to effect calling (S507). Thereafter, responses are waited for a predetermined period (S508). If there is no response from the destination MH 14 in the predetermined period, the value of counter n is incremented by 1 (S511), and a paging control packet is broadcasted again (S506, S507). This operation is repeated by N times at the maximum (S506 to S512). If there is no response even after the n-th paging operation, then the packet is discarded (S513).

If there is a response from the destination MH 14 (S508), by contrast, then the state of MH 14 registered in the location information management table 11A is changed from the standby state to the communicating state (S509), the buffered packet is transferred to the responded base station 13 (S510), and the packet 25 in the subsequent communication is routed to the destination MH 14. Thereafter, the flow returns to S501.

In response to the foregoing processing of the location information management server 11, the base station 13 and MH 14 do the following processing.

Figure 6:
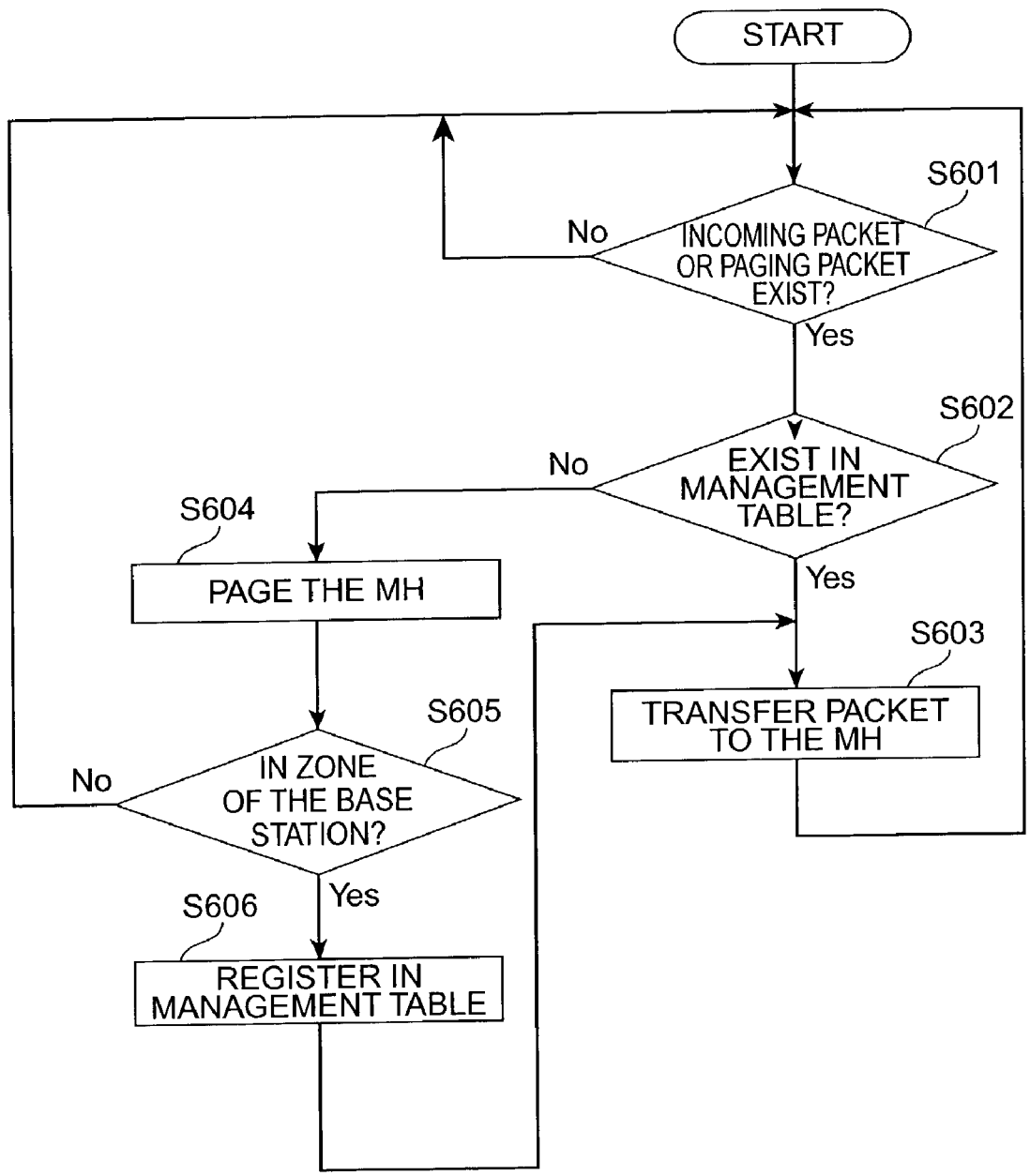
FIG. 6 is a flowchart showing the processing of a base station.

FIG. 6 shows an operation flow of the base station 13. First, the base station 13 determines whether or not a packet or a paging control packet has arrived and paging is executed (S601). If the packet or the paging control packet has arrived and paging is executed, the base station 13 refers to its own mobile station management table 13E, and verifies whether the IP address of the destination MH 14 included in the packet or paging control packet is registered or not (S602).

If the IP address of the destination MH 14 is registered in the mobile station management table 13E, a communication channel is used for transmitting the packet 25 to the destination MH 13 locating in the cell of the base station 13 (S603). Thereafter, the flow returns to step S601.

If the IP address of the destination MH 14 is not registered in the mobile station management table 13E, by contrast, a paging channel is used for broadcasting the address of the destination MH 14, to attempt paging (S604), and it is determined whether or not the MH 14 locates in the cell of the base station 13 (S605).

If the destination MH 14 does not locate in the cell of the base station 13, the flow returns to step S601. If the destination MH 14 locates in the cell of the base station 13, the IP address of the destination MH 14 is additionally registered in the mobile station management table 13E (S606), and a response packet is transmitted to the location information management server 11 (S603). Thereafter, the flow returns to step S601.

Figure 7:
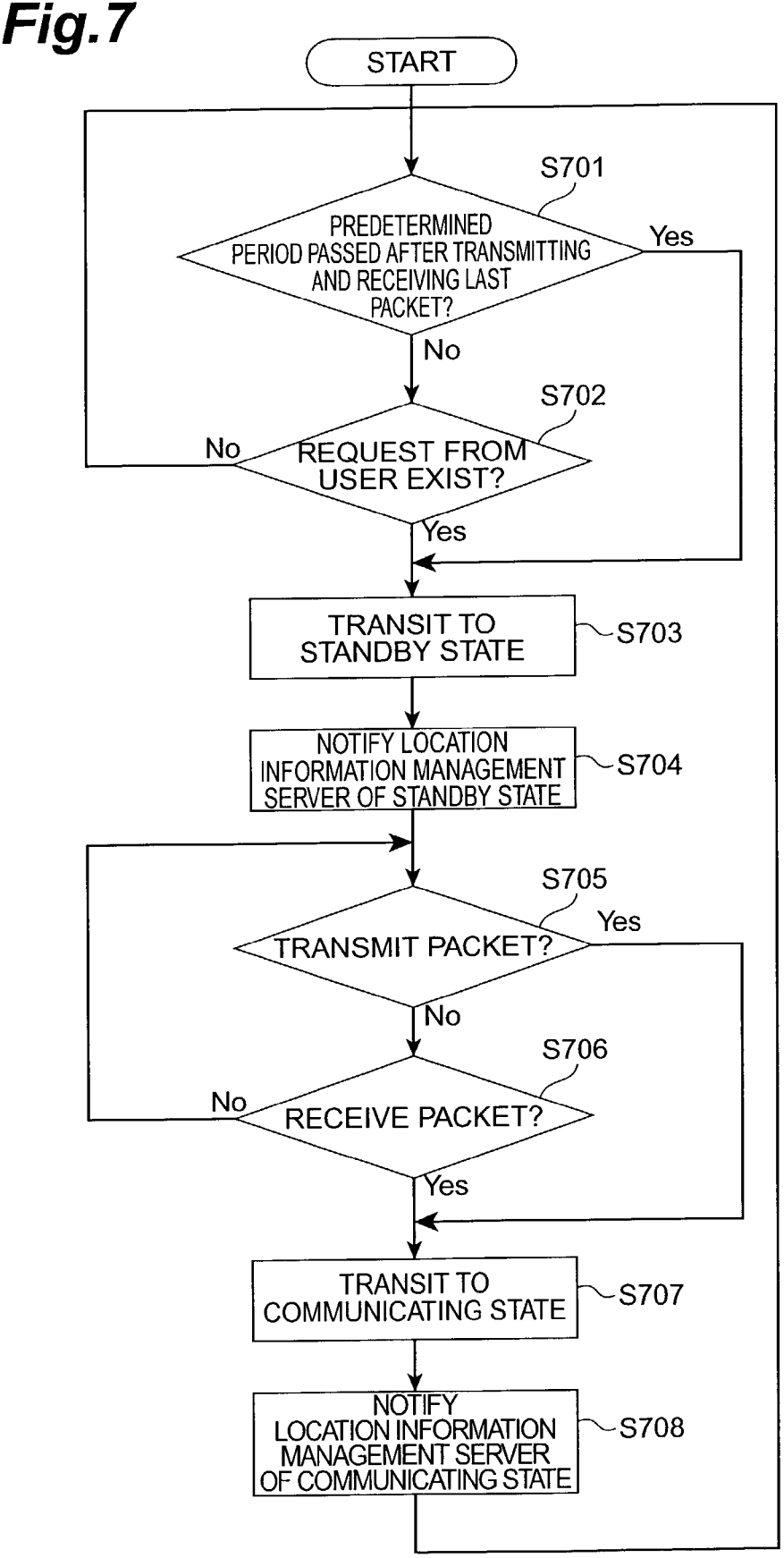
FIG. 7 is a flowchart showing the processing of an MH in the case where a communicating state is registered.

Operation flows of the MH 14, on the other hand, will be explained with reference to FIGS. 7 and 8. First, in the operation flow shown in FIG. 7, it is assumed that the "communication state" for the MH 14 is registered in the location information management server 11. In this state, it is monitored whether or not a predetermined period has passed after transmitting and receiving the last packet (S701), and whether or not there is a request from the user side (S702).

Here, if no packet is transmitted and received for a predetermined period (S701) or there is a request from the user side (S702), the registered state transits to the standby state (S703). Upon transiting to the standby state, the MH 14 notifies the location information management server 11 of the fact that it has transited to the standby state (S704). If the MH 14 transmits a packet for itself (S705) or receives a packet (S706), it transits to the communicating state (S707) and, simultaneously with the transiting, notifies the location information management server 11 of the fact that it has transited from the standby state to the communicating state (S708). Thereafter, the flow returns to S701, to repeat the processing.

Figure 8:
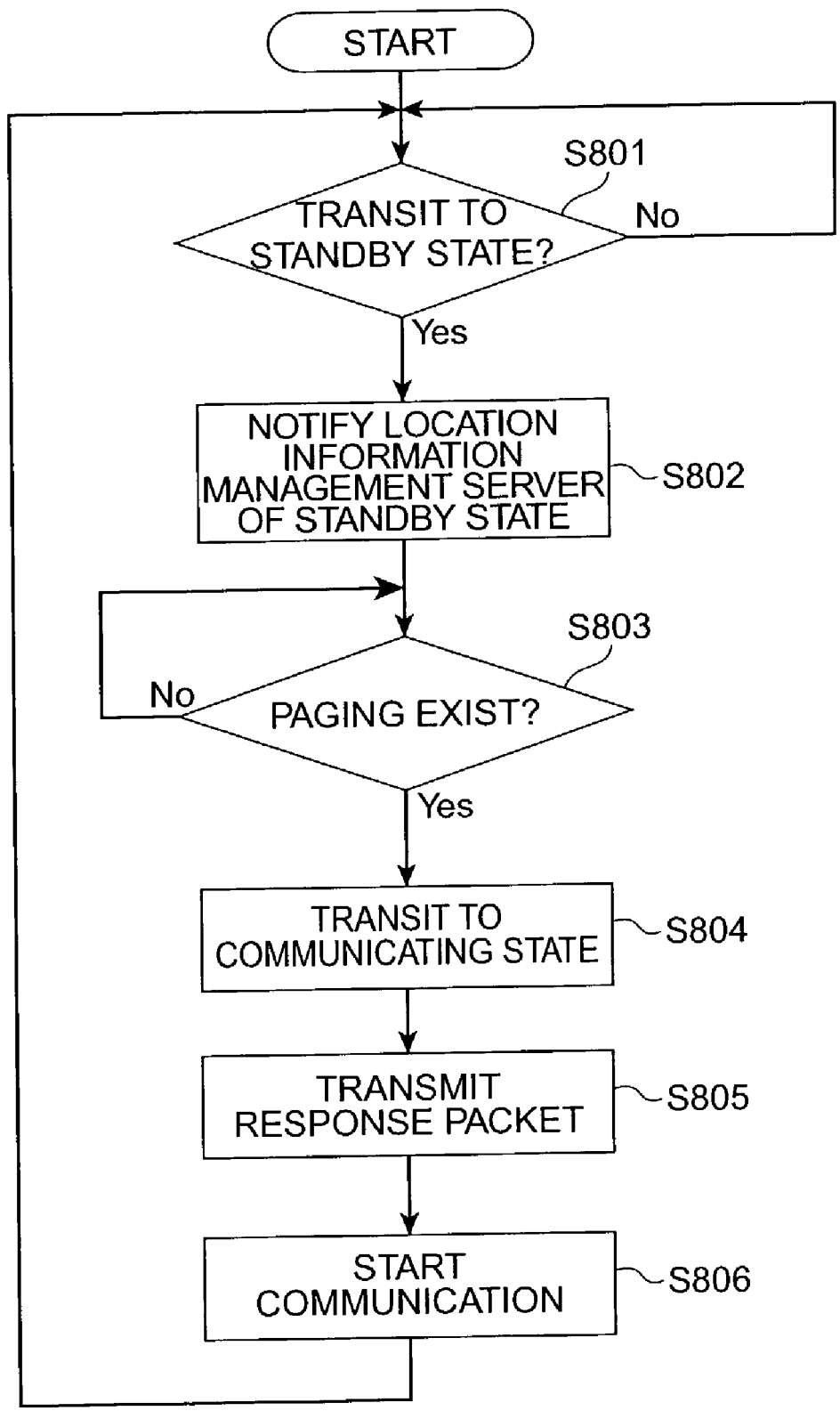
FIG. 8 is a flowchart showing the processing of an MH in the case where it is in the communicating state or in neither the communicating state with power ON nor the standby state.
Figure 9:
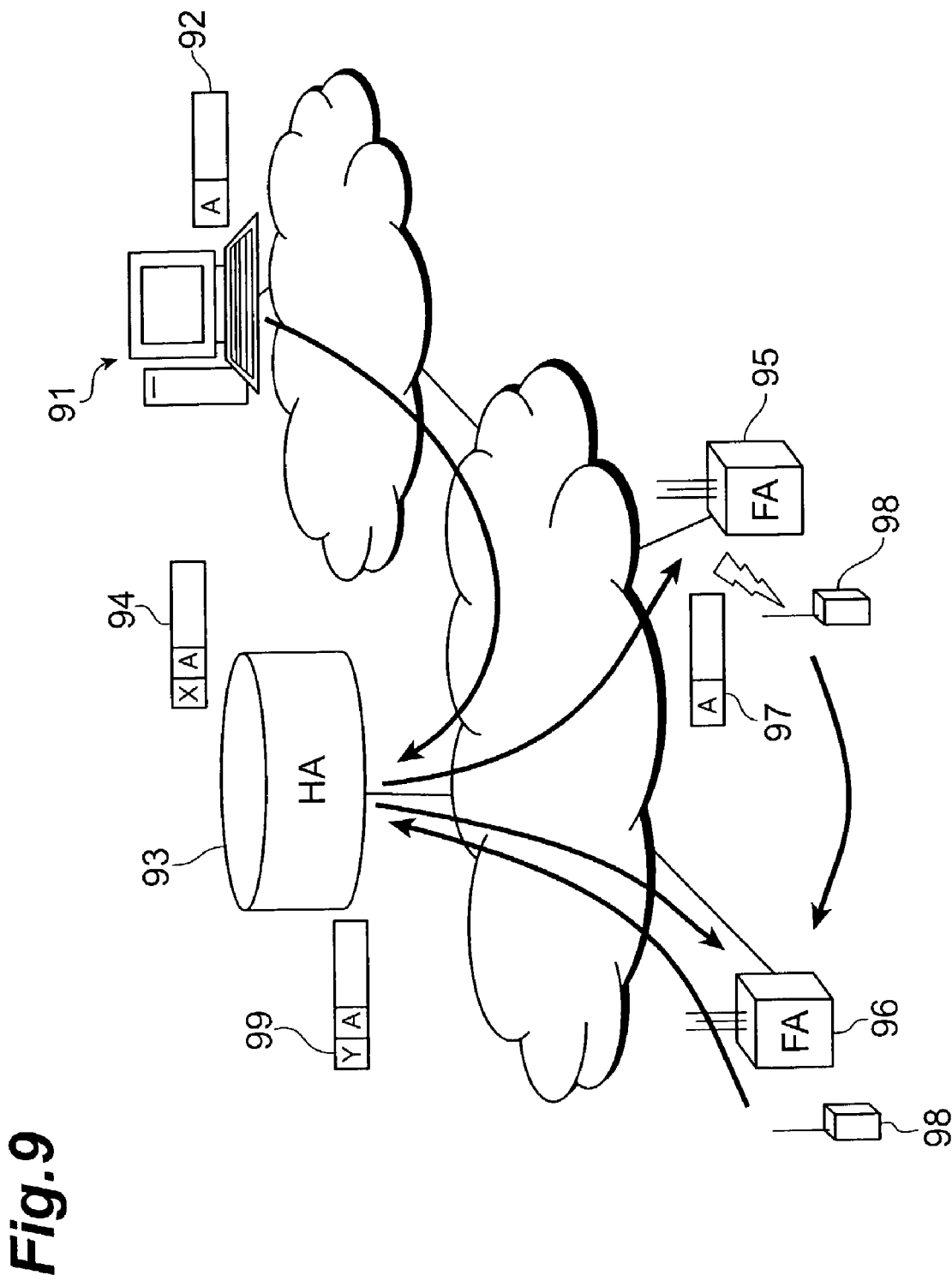
FIG. 9 is a view showing an outline of mobile IP.

In the operation flow shown in FIG. 8, on the other hand, the MH 14 is not assumed to be in the communicating state. And the MH 14 is not assumed to be in neither the communicating state with power ON nor the standby state.

First, in this state, it is determined whether the MH 14 should transit to the standby state or not (S801). Upon transiting to the standby state, the MH 14 notifies the location information management server 11 of the fact that it has transited to the standby state (S802). Subsequently, in the standby state, it is verified whether there is a paging for the MH 14 or not (S803). If there is a paging, the MH 14 immediately transits to the communicating state (S804), transmits to the location information management server 11 a response packet for notifying the location information management server 11 of the fact that it has transited from the standby state to the communicating state (S805), and starts communications (S806).

The foregoing processing in accordance with the first or second paging method (FIG. 4 or 5) executed by the location information management server 11 and its corresponding processing in the base station 13 and MH 14 (FIGS. 6, 7, and 8) can define a paging area even in IP networks, thus paging can be executed to a paging area constituted by a plurality of base stations, whereby the unnecessary control signal traffic at the time of location registration can be cut down, which allows the channel efficiency and battery conservation to improve. Also, since the compliance with IP networks is taken into consideration, a mobile communication network highly compatible with the Internet while being able to implement IP can be realized as compared with the conventional techniques.

In particular, the second paging method mentioned above is further effective in that, since paging control packets having a short packet length are used for paging, the control signal traffic at the time of paging can be suppressed to a low level, thus making it possible to cut down the network load.

As explained in the foregoing, the present invention is effective in that it can define a paging area in IP network as well, and execute paging to a paging area constituted by a plurality of base stations, so that the unnecessary control signal traffic at the time of location registration can be cut down, whereby the channel efficiency and battery conservation can be improved.

Also, since IP networks are taken into consideration, the present invention is more effective than the conventional techniques in that it can implement IP and realize a mobile communication network highly compatible with the Internet.

Multicasting the paging control packets instead of packets is effective not only in the two points mentioned above but also in that, since paging control packets having a short packet length are used for paging, the control signal traffic at the time of paging can be suppressed to a low level, whereby the network load can be cut down.

What is claimed is:

1. A paging method in a mobile communication system including a plurality of base stations connected to an IP network, a plurality of mobile stations located in a cell formed by base stations, and a server, connected to the IP network, comprising a location information management table storing location information of the mobile stations including a connection state, wherein a set of cells formed by base stations constitutes a paging area, and wherein said server manages information of a mobile station in standby as location information of mobile stations about a paging area in which the mobile stations are located;

said method comprising:

transferring a packet transmitted from a base station to a mobile station, to said server;

determining by said server receiving the packet, according to the location information management table, whether the mobile station is in a standby state or not;

copying the packet by said server, if the mobile station is in the standby state, from the server to the number of base stations corresponding to a paging area in which the mobile station has registered its location; and multicasting by said server said packets obtained by the step of copying to said base stations corresponding to the paging area.

2. A paging method in a mobile communication system including a plurality of base stations connected to an IP network, a plurality of mobile stations located in a cell formed by base stations, and a server, connected to the IP network, comprising a location information management table storing location information of the mobile stations including a connection state, wherein a set of cells formed by base stations constitutes a paging area, and wherein said server manages information of a mobile station in standby as location information of mobile stations about a paging area in which the mobile stations are located;

said method comprising:

transferring a packet transmitted from a base station to a mobile station, to said server;

determining by said server receiving the packet, according to the location information management table, whether the mobile station is in a standby state or not;

buffering said packets by the server, if the mobile station is in the standby state;

generating paging control packets after said buffering for the number of base stations corresponding to a paging area in which the mobile station has registered its location; and multicasting by said server the paging control packets to the base stations corresponding to the paging area.

3. A paging method according to claim 1, wherein said server manages location information about an IP address of a base station in whose cell a communicating mobile station is located in, and wherein said base station includes a mobile station management table registering IP addresses of communicating mobile stations;

said method further comprising:

determining a registration by a base station having received a paging control packet by multicast, through identification of a mobile station registration in the mobile station management table;

transmitting a paging signal by the base station to the mobile stations in standby via a broadcasting control channel, if the mobile stations are not registered in the mobile station management table; and processing a response time, wherein if said mobile station responds to said step of transmitting a paging signal, said base station adds an IP address of the mobile station to the mobile station management table and transmits to said server a control signal indicating that the mobile station is located in a cell of said base station.

4. A paging method according to claim 2, wherein said server manages location information about an IP address of a base station in whose cell a communicating mobile station is located in, and wherein said base station includes a mobile station management table registering IP addresses of communicating mobile stations;

said method further comprising:

determining a registration by a base station having received a paging control packet by multicast, through identification of a mobile station registration in the mobile station management table;

transmitting a paging signal by the base station to the mobile stations in standby via a broadcasting control channel, if the mobile stations are not registered in the mobile station management table, and processing a response time, wherein if said mobile station responds to said step of transmitting a paging signal, said base station adds an IP address of the mobile station to the mobile station management table and transmits to said server a control signal indicating that the mobile station is located in a cell of the base station.

5. A mobile communication system including a plurality of base stations connected to an IP network, a plurality of mobile stations located in a cell formed by base stations and a server, connected to the IP network, for managing location information of the mobile stations including a connection state, wherein a set of cells formed by the base stations constitutes a paging area;

said base stations comprising:

transfer means for transferring to said server a packet transmitted to a mobile station when at least one of said base stations becomes a sender;

said server comprising:

a location information management table storing information of a mobile station in standby as location information of mobile stations about a paging area in which said mobile station is located;

determination means for determining whether the mobile station is in a standby state or not according to the location information management table when the packet is received from the transfer means;

copy means for copying said packet from the server to the number of base stations corresponding to a paging area in which the mobile station has registered its location if the mobile station is in the standby state; and multicast means for multicasting said packets obtained by the copy means to said base stations corresponding to said paging area.

6. A mobile communication system including a plurality of base stations connected to an IP network, a plurality of mobile stations located in a cell formed by base stations, and a server, connected to the IP network, for managing location information of the mobile stations including a connection state, wherein a set of cells formed by said base stations constitutes a paging area;

said base stations comprising:

transfer means for transferring to said server a packet transmitted to a mobile station when at least one of said base stations becomes a sender;

said server comprising:

a location information management table storing information of a mobile station in standby as location information of mobile stations about a paging area in which said mobile station is located;

determination means for determining whether the mobile station is in a standby state or not according to the location information management table when the packet is received from the transfer means;

generation means for buffering said packet and generating paging control packets for the number of base stations corresponding to a paging area in which the mobile station has registered its location if said mobile station is in the standby state; and multicast means for multicasting the paging control packets to the base stations corresponding to the paging area.

7. A mobile communication system according to claim 5, wherein the location information management table further stores information of a communicating mobile station as location information of mobile stations about an IP address of a base station in whose cell the communicating mobile station is located in;

said location information management table further comprising:

a mobile station management table registering IP addresses of communicating mobile stations;

registration determining means for determining whether the mobile station is registered in the mobile station management table or not if a packet or a paging control packet is received;

paging means for paging mobile stations in standby via a broadcasting control channel if the mobile stations are not registered in the mobile station management table; and response time processing means for adding an IP address of said mobile station to the mobile station management table and transmitting to said server a control signal indicating that the mobile station is located in a cell of the base station if said mobile station responds to the paging.

8. A mobile communication system according to claim 6, wherein the location information management table further stores information of a communicating mobile station as location information of mobile stations about an IP address of a base station in whose cell the communicating mobile station is located in;

said location information management table further comprising:

a mobile station management table registering IP addresses of communicating mobile stations;

registration determining means for determining whether the mobile station is registered in the mobile station management table or not if a packet or a paging control packet is received;

paging means for paging mobile stations in standby via a broadcasting control channel if the mobile stations are not registered in the mobile station management table; and response time processing means for adding an IP address of the mobile station to the mobile station management table and transmitting to said server a control signal indicating that the mobile station is located in a cell of the base station if said mobile station responds to the paging.

9. A server constituting a mobile communication system together with a plurality of base stations connected to an IP network, and a plurality of mobile stations located in a cell formed by the base station;

wherein, in the mobile communication system, a set of cells formed by base stations constitutes a paging area; said server being connected to the IP network and managing location information of mobile stations including a connection state;

said server comprising:

a location information management table configured to store information of a mobile station in standby as location information of the mobile stations about a paging area in which said mobile station is located;

determination means for determining whether the mobile station is in a standby state or not according to the location information management table when a packet transmitted to said mobile station is received;

copy means for copying said packet from the server to the number of base stations corresponding to a paging area in which the mobile station has registered its location if the mobile station is in the standby state; and multicast means for multicasting said packets obtained by the copying to said base stations corresponding to the paging area.

10. A server constituting a mobile communication system together with a plurality of base stations connected to an IP network, and a plurality of mobile stations located in a cell formed by the base station;

wherein, in the mobile communication system, a set of cells formed by base stations constitutes a paging area; said server being connected to the IP network and managing location information of said mobile stations including a connection state;

said server comprising:

a location information management table configured to store information of a mobile station in standby as location information of the mobile stations about a paging area in which said mobile station is located;

determination means for determining whether the mobile station is in a standby state or not according to the location information management table when a packet transmitted to the mobile station is received;

generation means for buffering said packet and generating paging control packets for the number of base stations corresponding to a paging area in which the mobile station has registered its location if said mobile station is in the standby state; and multicast means for multicasting the paging control packets to said base stations corresponding to the paging area.

11. A server according to claim 9, wherein the location information of the mobile stations is stored in the location information management table while using IP addresses of the mobile stations as a key.

12. A server according to claim 10, wherein the location information of the mobile stations is stored in the location information management table while using IP addresses of the mobile stations as a key.

13. A server according to claim 9, wherein each paging area is provided with a unique paging area identifier, and wherein said server manages at least one paging area according to said paging area identifier.

14. A server according to claim 10, wherein each paging area is provided with a unique paging area identifier, and wherein said server manages at least one paging area according to said paging area identifier.

15. A base station constituting a mobile communication system together with a plurality of mobile stations located in a cell formed by said base station, and a server, connected to an IP network, for managing location information of the mobile stations including a connection state; said base station being connected to the IP network; a set of a cell formed by the base station and cells formed by other base stations adjacent thereto constituting a paging area;

said base station comprising:
transfer means for transferring to said server a packet transmitted to a mobile station when the base station becomes a sender;
a mobile station management table configured to register IP addresses of communicating mobile stations;
registration determining means for determining whether the mobile station is registered in the mobile station management table or not, if a packet or a paging control packet is received from said server;
transmission means for transmitting a packet to the mobile station by using a communication channel if said mobile station is registered in the mobile station management table;
paging means for paging mobile stations in standby via a broadcasting control channel if the mobile station is not registered in the mobile station management table; and
response time processing means for adding an IP address of said mobile station to said mobile station management table and transmitting to said server a control signal indicating that the mobile station is located in a cell of the base station if the mobile station responds to the paging.

16. A paging program executed by a computer provided with a server constituting a mobile communication system together with a plurality of base stations connected to an IP network, and a plurality of mobile stations located in a cell formed by a base station; wherein, in the mobile communication system, a set of cells formed by base stations constitutes a paging area; said server being connected to the IP network and comprising a location information management table storing information of a mobile station in standby as a location information of said mobile stations about a paging area in which said mobile station is located;

said program causing said computer to execute the steps of:
determining whether the mobile station is in a standby state or not according to the location information management table when a packet transmitted to said mobile station is received;
copying said packet from the server to the number of base stations corresponding to a paging area in which the mobile station has registered its location if said mobile station is in the standby state; and
multicasting said packets obtained by the copying to said base stations corresponding to the paging area.

17. A paging program executed by a computer provided with a server constituting a mobile communication system together with a plurality of base stations connected to an IP network, and a plurality of mobile stations located in a cell formed by a base station; wherein, in the mobile communication system, a set of cells formed by base stations constitutes a paging area; said server being connected to the IP network and comprising a location information management table storing information of a mobile station in standby as a location information of said mobile stations about a paging area in which said mobile station is located;

said program causing said computer to execute the steps of:
determining whether the mobile station is in a standby state or not according to the location information management table when a packet transmitted to mobile station is received;
buffering said packet;
generating paging control packets after said buffering for the number of base stations corresponding to a paging area in which the mobile station has registered its location; and
multicasting the paging control packets to the base stations corresponding to the paging area.

* * * * *